(12) United States Patent
Liu et al.

(10) Patent No.: US 6,788,843 B2
(45) Date of Patent: Sep. 7, 2004

(54) OPTICAL CROSSCONNECT AND MIRROR SYSTEMS

(75) Inventors: Ai Qun Liu, Singapore (SG); Vadakke Matham Murukeshan, Singapore (SG); Xuming Zhang, Singapore (SG); Chao Lu, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 10/223,596

(22) Filed: Aug. 19, 2002

(65) Prior Publication Data

US 2003/0053743 A1 Mar. 20, 2003

Related U.S. Application Data

(60) Provisional application No. 60/313,766, filed on Aug. 20, 2001.

(51) Int. Cl.[7] .................................................. G02B 6/35
(52) U.S. Cl. ............................ 385/18; 385/17; 385/24; 385/140
(58) Field of Search ....................... 385/24, 140, 15–18

(56) References Cited

U.S. PATENT DOCUMENTS

| | | | |
|---|---|---|---|
| 5,982,554 A | | 11/1999 | Goldstein et al. ........... 359/629 |
| 6,256,430 B1 | | 7/2001 | Jin et al. ..................... 385/18 |
| 6,363,183 B1 | * | 3/2002 | Koh ............................. 385/19 |
| 6,483,962 B1 | * | 11/2002 | Novotny ..................... 385/18 |
| 6,600,850 B1 | * | 7/2003 | Fan .............................. 385/18 |
| 2002/0071171 A1 | * | 6/2002 | Greywall ................... 359/292 |
| 2002/0181110 A1 | * | 12/2002 | Bower et al. .............. 359/599 |

* cited by examiner

Primary Examiner—John D. Lee
(74) Attorney, Agent, or Firm—Fish & Richardson P.C.

(57) ABSTRACT

The invention features the drawbridge assembly and its applications in optical switches, optical crossconnects, optical add/drop multiplexers and variable optical attenuators. In optical switches and optical crossconnects, an array of the drawbridge assemblies can be used to redirect the multiple input lights to multiple outputs. In add/drop multiplexers, the drawbridge assemblies can select the light channels to be added and dropped. In the attenuator embodiment, a vertical mirror is inserted into two fibers, the first one as the input and the second one as output. The drawbridge assembly controls the position of the vertical mirror for blocking a certain portion of the light and enabling the attenuation. The continuous change of the mirror position results in variable attenuation. A series of VOA form a multi-channel VOA system on a single substrate.

49 Claims, 8 Drawing Sheets

(a)

(b)

(a)

(b)

415

OPTICAL CROSSCONNECT AND MIRROR SYSTEMS

RELATED APPLICATIONS

This application claims the priority of U.S. Provisional Patent Application No. 60/313,766, filed on Aug. 20, 2001, entitled "Optical Crossconnect and Mirror Systems," to Ai Qun Liu, Xuming Zhang, Vadakke Matham Murukeshan, and Chao Lu, the contents of which are incorporated by reference.

TECHNICAL FIELD

This invention relates to optical mirror systems and their applications in optical switches, optical crossconnects, optical add/drop multiplexers and variable optical attenuator systems.

BACKGROUND

Dense wavelength division multiplexing (DWDM) systems and all-optical networks are in rapid development to provide high-speed signal processing in their native optical form without the need for expensive and time delaying conversions. The require the use of optical switches and optical crossconnect devices to redirect light signals and facilitate switching. Optical add/drop multiplexers are also key components in optical networks to add and drop certain light channels. In addition, single and multi-channel variable optical attenuators (VOAs) have wide applications in fiber-optic communication systems, for example, in limiting and regulating the power in fibers, equalizing power levels of different wavelength channels in dense wavelength division multiplexed (DWDM) systems, flattening the gain of optical amplifiers, and balancing the signals in optical add/drop multiplexers (OADMs).

SUMMARY

According to one aspect of the invention, an optical mirror system includes a substrate; a reflective assembly attached to the substrate; an actuating mechanism attached to the substrate; and a drawbridge assembly mechanically coupled to the reflective assembly where upon activation of the actuating mechanism, the reflective assembly moves between a first position in which the reflective assembly is in a non-reflective state and a second position in which the reflective assembly is in a reflective state.

One or more of the following features may also be included. The drawbridge assembly includes a holding plate; at least one drawing member having two ends, a first end fixedly attached to the substrate; and a biasing mechanism for mechanically coupling the holding plate to the reflective assembly, wherein the actuating mechanism causes the biasing mechanism to bend the reflective assembly. The holding plate mechanically supports the biasing mechanism and is connected to a second end of the at least one drawing member.

In certain embodiments, the reflective assembly includes a mounting plate and a vertical mirror mechanically coupled to the mounting plate. Further, the non-reflective state of the reflective assembly forms a non-inclined configuration of the drawbridge assembly maintained by a resting state of the biasing mechanism, and the reflective state of the reflective assembly forms an inclined configuration of the drawbridge assembly caused by the actuating mechanism and a non-resting state of the biasing mechanism.

As yet another feature, the biasing mechanism includes a flexible structure for shaping the reflective state and the non-reflective state of the optical assembly.

According to another aspect of the invention, an optical crossconnect system includes a light beam traveling along a path; at least one optical mirror system having a substrate, a reflective assembly attached to the substrate, and an actuating mechanism attached to the substrate. The optical crossconnect also includes a drawbridge assembly mechanically coupled to the reflective assembly where upon activation of the actuating mechanism, the reflective assembly moves between a first position in which the reflective assembly is in a non-reflective state and a second position in which the reflective assembly is in a reflective state.

The optical crossconnect further includes at least one output fiber for emitting the light beam; at least one input fiber for receiving the light beam, where the light beam passes through the optical system and the path of the light beam is determined by an reflective state and a non-reflective state of the optical mirror system.

One or more of the following features may also be included. The optical crossconnect system further includes an array of collimating lenses and an array of coupling lenses for signal coupling and collimation of the light beam.

In certain embodiments, the optical crossconnect system also includes a scalable configuration having a plurality of rows and columns.

As yet another feature, the drawbridge assembly of the optical mirror system includes a holding plate; at least one drawing member having two ends, a first end fixedly attached to the substrate; and a biasing mechanism for mechanically coupling the holding plate to the reflective assembly where the actuating mechanism causes the biasing mechanism to bend the reflective assembly.

Embodiments may have one or more of the following advantages.

In optical fiber crossconnect systems, optical mirrors having a drawbridge assembly provide superior benefits in switching.

The combination of MEMS and optical technologies utilizes existing miniaturization technologies to fabricate the optical mirror systems. The use of optical mirrors in optical crossconnect systems provides the advantages of compactness, low driving voltage and current, low power consumption, compatibility with existing IC processes, low insertion loss, and a higher switch time. Furthermore, their use eliminates the drawbacks of large size, wobbling, and mechanical instability.

In particular, the flexible configuration of the reflective and non-reflective states of the system maintains the vertical mirror in an uplifted position thereby minimizing mechanical failure in the reflective and non-reflective switching positions. Important benefits are also achieved by eliminating the movement of the drawbridge assembly. Optical switching is accomplished without movement of the fixed components attached to the substrate. Consequently, the optical mirror system requires no additional actuators, thus reducing the number of elements required.

Another benefit is the scalability of the optical crossconnect systems. Forming optical crossconnect systems of large arrays can be easily and efficiently achieved, providing low power consumption and lower switch time.

The details of one or more embodiments of the invention are set forth in the accompanying drawings and the description below. Other features, objects, and advantages of the invention will be apparent from the description and drawings, and from the claims.

DETAILED DESCRIPTION

To better understand the invention, it is helpful to clarify the meaning of certain terms. The term "optical mirror system" refers generally to the complete optical system, while the term "vertical mirror" refers to the reflective mirror mounted on the surface of the optical mirror system. Therefore, the optical mirror system includes a vertical mirror.

The structural components of the optical mirror system and the optical crossconnect system will be described first, with the accompanying FIGS. 1–7.

Figure 1:
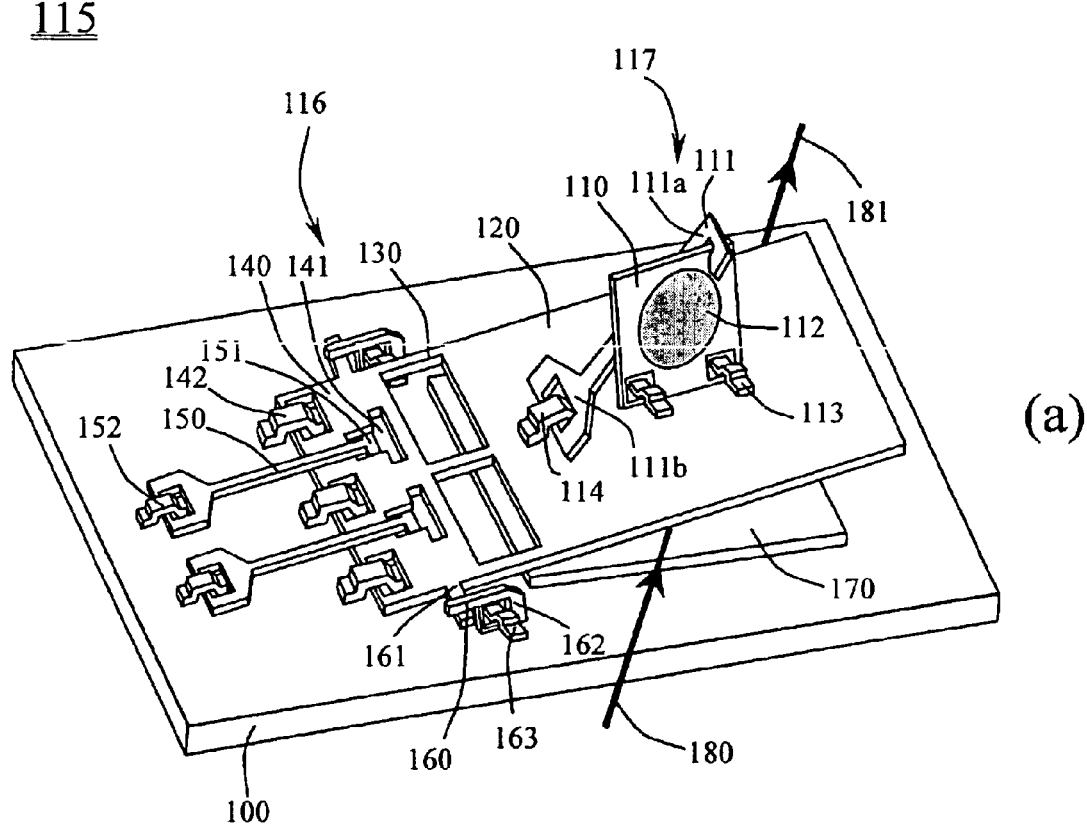
FIG. 1(a) is a perspective view of an optical mirror system in a non-reflective state.
FIG. 1(b) is a side view of the optical mirror system of FIG. 1(a).
Figure 1:
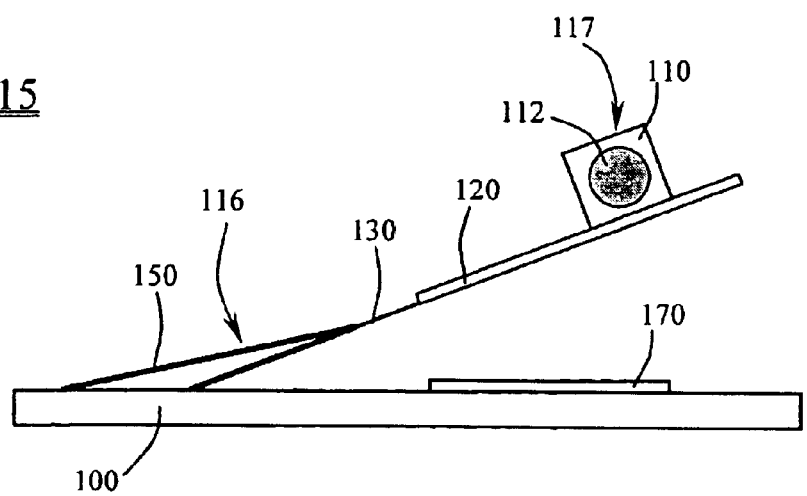

Referring to FIG. 1, an optical mirror system 115 includes a substrate 100, a drawbridge assembly 116, and a reflective assembly 117. The drawbridge assembly 116 includes a holding plate 140, a biasing mechanism 130, and a drawing member 150. The reflective assembly 117, which is mounted on the upper surface of the substrate 100, includes a vertical mirror 110 and a mounting plate 120. The optical mirror system 115 further includes a locking mechanism in the form of anti-disintegration interlockers 160 for mechanically connecting the drawbridge assembly 116 to the upper surface of substrate 100. An electrode 170 serving as the actuating mechanism of the optical mirror system is also shown.

In one embodiment, the biasing mechanism 130 which defines the configuration of the drawbridge assembly 116, includes a flexible structure in the form of bending beams 130 or springs 230.

In FIG. 1(a), a perspective view of the optical mirror system 115 in a first position in a non-reflective state is shown for a system 115 having a bending biasing mechanism 130. In the reflective assembly 117, the vertical mirror 110 is mechanically coupled to the mounting plate 120 by a microhinge 113 and is fixedly maintained in a vertical position by a head holder 111. The head holder 110 includes a first free end 111(a) and a second fixed end 111(b). The first free end 111(a) has a groove region for securely holding the vertical mirror 110 in an upright vertical position, and a second fixed end 111(b) is mechanically coupled to the mounting plate 120 by a micro-hinge 114. The vertical mirror 110 further includes a reflective part 112 which is deposited with metals to increase light reflectance.

In the embodiment of FIG. 1(a), the mounting plate 120 is mechanically connected to the bending biasing mechanism 130 of the drawbridge assembly 116. The biasing mechanism 130 is formed by bending beams which connect the mounting plate 120 to the holding plate 140. The holding plate 140 is mechanically coupled to the upper surface of the substrate 100 by at least one microhinge 142. Similarly, the drawing member 150 is also mechanically coupled to the upper surface of substrate 100 by at least one microhinge 152.

Specifically, in this embodiment, an elongated drawing beam forms the drawing member 150 having a latching mechanism for mechanically coupling with the upper surface of the substrate 100 and the holding plate 140. One end of the drawing member 150 has a T-shaped head 151 which mechanically couples with a T-shaped aperture 141 of the holding plate 140, thereby forming a non-inclining configuration of the optical mirror system 115 in a non-reflective state. As seen in FIG. 1(b), this non-reflective configuration is formed by the holding plate 140 being held at a non-reflective angle relative to the upper surface of the substrate 100.

In this first position in a non-reflective state, the vertical mirror 110 and the mounting plate 120 are positioned sufficiently above the upper surface of the substrate 100 so that a spacing between the mounting plate 120 and the substrate 100 is formed. In this spacing, an input light beam 180 can pass through to form an output light beam 181.

In the optical mirror system 115, the electrode 170 forming the actuating mechanism of the system is mounted on the upper surface of substrate 100 and positioned below the mounting plate 120. This way, the mounting plate 120 and the vertical mirror 110 are mechanically moved simultaneously in response to the actuating effect of the electrode 170.

In this embodiment, the optical mirror system 115 further includes a locking mechanism in the form of an anti-disintegration interlocker 160 for mechanically connecting the drawbridge assembly 116 to the upper surface of substrate 100. The anti-disintegration interlocker 160 are employed to prevent the drawbridge assembly 116 from disintegrating when the optical mirror system 115 is in dynamic operation. The interlocker 160 includes a latching beam 161 which protrudes from the holding plate 140 and a pressing beam 162 which is securely hinged to the substrate 100.

Referring to FIGS. 2(a) and 2(b), FIG. 2(a) is a perspective view of the optical mirror system 115 in a second position in a reflective state. FIG. 2(b) shows the optical mirror system 115 on a side view for better appreciation of its reflective state. The reflective assembly 117, namely the mounting plate 120, is shown in a downward inclined position relative to its resting state, with the vertical mirror 110 also shown in an inclined configuration. On the other hand, the drawbridge assembly 116 is shown as having a similar configuration as in the first position in a non-reflective state. In particular, the drawbridge assembly 116 is maintained by the holding plate 140 and the drawing member 150, whereas the bending biasing mechanism 130 causes the reflective assembly 117 to incline downward.

Figure 3:
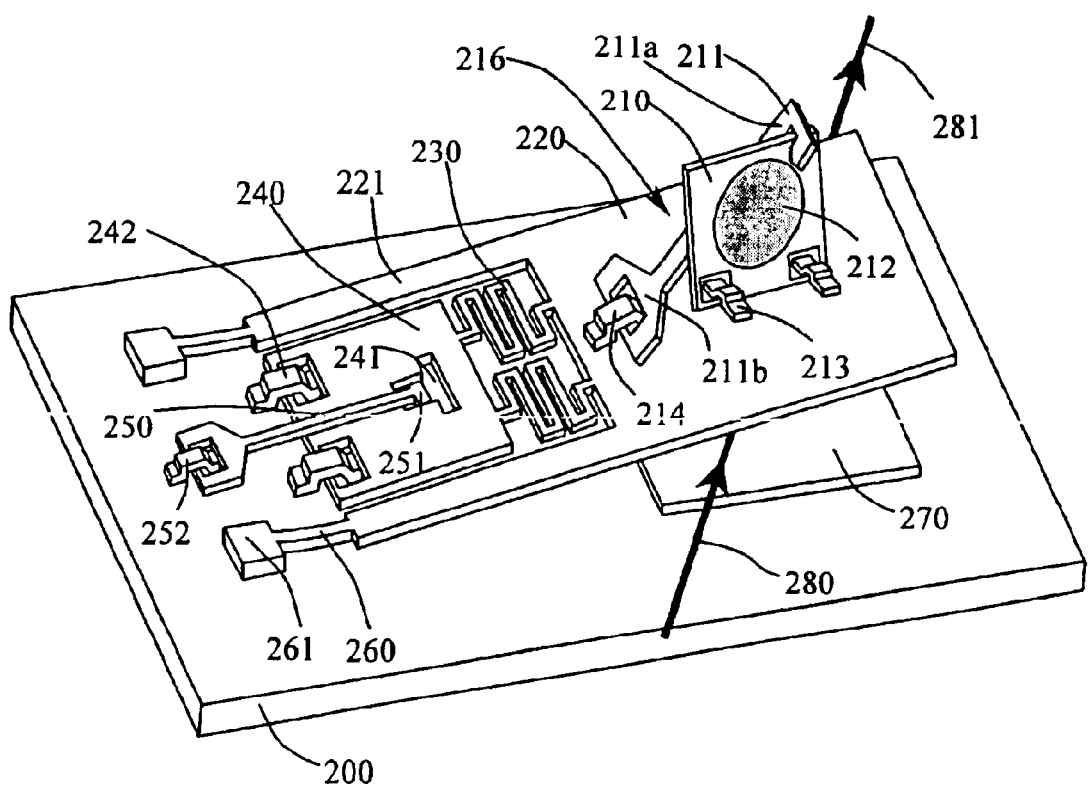
FIG. 3 is a perspective view of an optical mirror system in a non-reflective state with an alternate biasing mechanism.

FIG. 3 shows another embodiment of the optical mirror system in the first position in a non-reflective state having an alternate spring biasing mechanism 230. An optical mirror system 216 includes a vertical mirror 210 mechanically coupled to a mounting plate 220 by at least one microhinge 213. The vertical mirror 210 is maintained in a vertical position by a holder 211.

The vertical mirror 210 is mechanically coupled to the mounting plate 220 by a microhinge 213 and is fixedly maintained in a vertical position by a head holder 211. The head holder 211 includes a first free end 211(a) and a second fixed end 211(b). The first free end 211(a) has a groove region for securely holding the vertical mirror 210 in an upright vertical position, and the second fixed end 211(b) is mechanically coupled to the mounting plate 220 by a microhinge 214. The vertical mirror 210 further includes a reflective part 212 to maximize light reflectance.

The mounting plate 220 is mounted on the substrate 200 by extended plates 221, flexible beams 260, and anchors 261. The mounting plate 220 is further connected to the holding plate 240 by a spring biasing mechanism 230. The holding plate 240 is mechanically coupled to the substrate 200 by a microhinge 242. The drawing member 250 is also mechanically coupled to the substrate 200 by a microhinge 252. The microhinge 251 is coupled to the T-shaped aperture 241 in the holding plate 240. This way, the vertical mirror 210 is lifted by the structure of the drawbridge assembly 216 which includes the spring biasing mechanism 230, the holding plate 240, the extended plate 221, the flexible beam 260, the anchor 261, and the drawing member 250. An electrode 270 serves as the electrostatic actuating mechanism in this embodiment.

In the non-reflective state of the optical mirror system 215, when the vertical mirror 210 is lifted, an input light beam 280 passes through the spacing formed between the lifted vertical mirror 210 and mounting plate 220, and the electrode 270, to form the output light beam 281. The mounting plate 220 inclines the drawbridge assembly 216 downward, and any disintegration of the drawbridge assembly 216 is unlikely to occur in dynamic operation if the lengths and widths of the extended plate 221 and the flexible beams 260 are properly selected.

Figure 4:
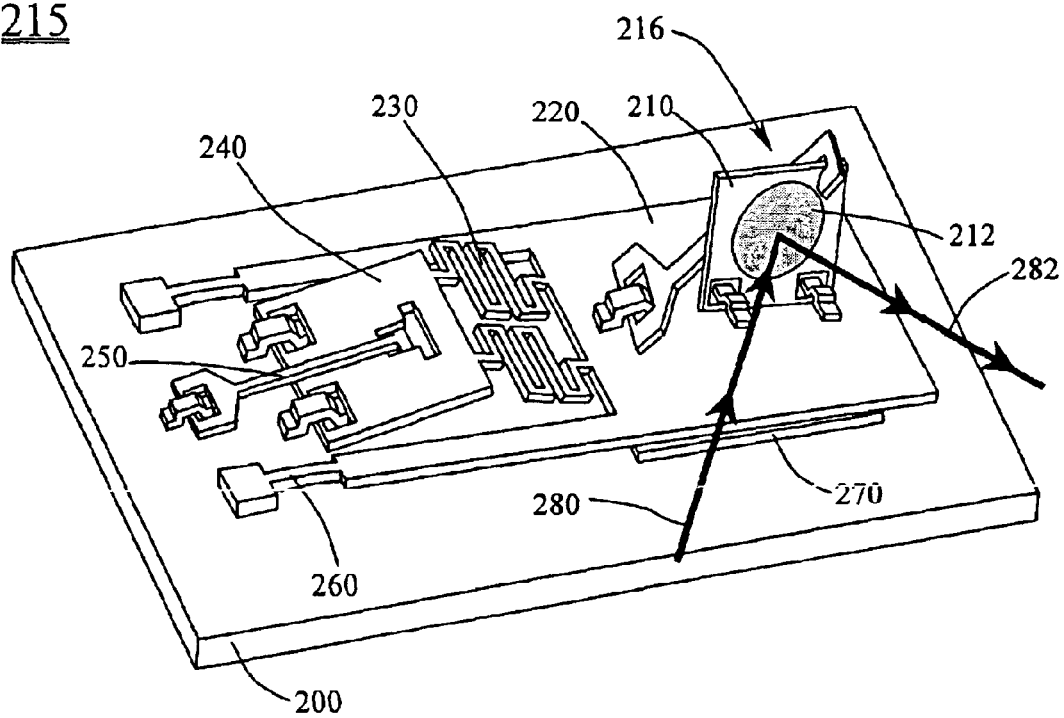
FIG. 4 is a perspective view of the optical mirror system of FIG. 3 in a reflective state.

Referring to FIG. 4, the vertical mirror 210 in FIG. 4 is shown in the second position in a reflective state, with corresponding changes in the configuration of the drawbridge assembly 216 and reflective assembly 217. In this reflective state, the input light beam 280 transmitted to the optical mirror system 215 is reflected by the reflective part 212 of the vertical mirror 210 and redirected to a different direction in the form of the output light beam 282.

Figure 5:
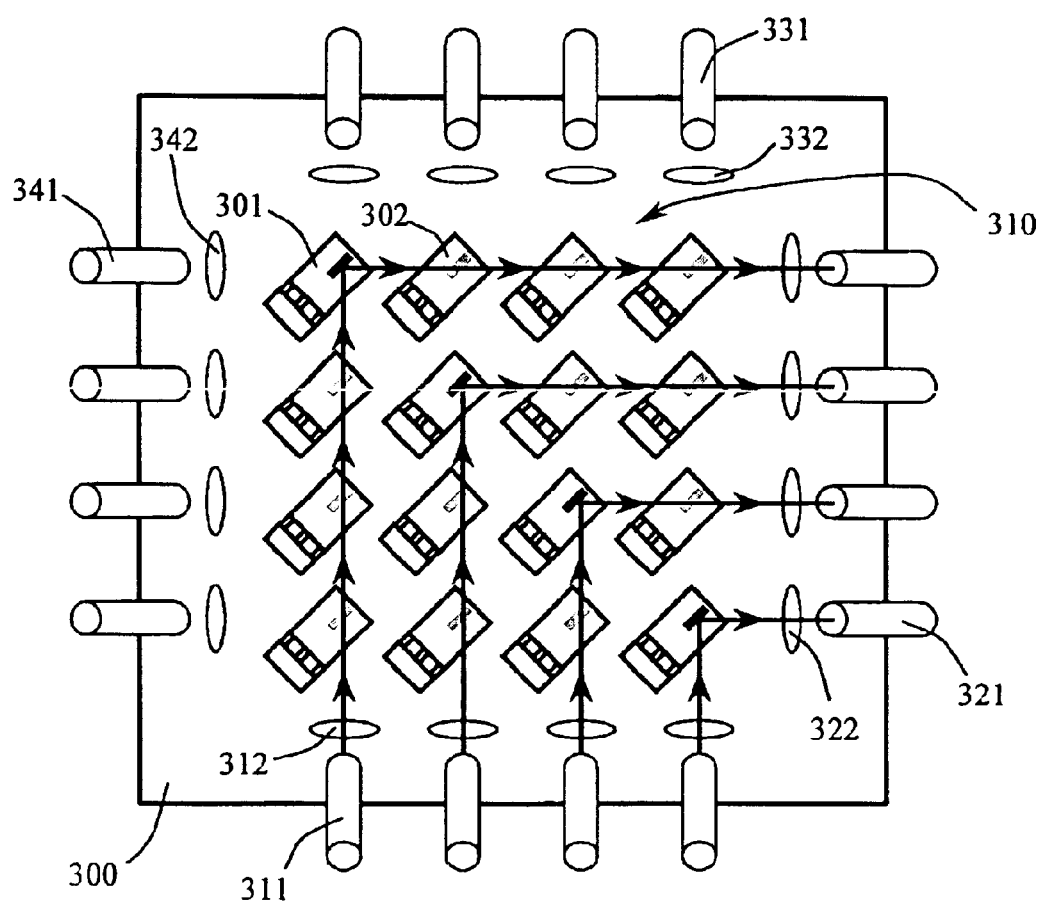
FIG. 5 is a diagrammatic view of an optical crossconnect system.

FIG. 5 illustrates a non-blocking N to N, free-space optical crossconnect system 315 using an array of optical mirror systems 310 disposed in columns and rows. In certain embodiments, each of the optical mirror systems has a drawbridge assembly 116 (not shown) and a reflective assembly 117 (not shown). The optical mirror systems 310 are used for redirecting the input optical beams 312. The optical crossconnect system 315 includes a matrix 300 formed by a plurality of optical mirror systems 310, a plurality of optical fibers 311 for inputting the light beams, a plurality of optical fibers 321 for outputting the light beams, and a micro-lens array 312 and 322 for collimating and coupling the light beams.

The collimated light beams passes through the non-reflective optical mirror systems 302 and are redirected by the reflective state optical mirror systems 301 to the output fibers 321, where the micro-lens array 322 are employed to couple the light signals into the N output fibers 321. The fibers 331 along with the collimating lenses 332 are used to drop the light beams. For example, one light beam from the input fibers 311 can be directly coupled to one fiber of the fibers 331 if all the optical mirror systems in its light path are in the non-reflective state. Similarly, the fibers 341 and the lenses 342 are employed to add the light beams to the output fibers 321. This optical crossconnect system 315 provides the functions of both the cross-connection and add/drop multiplexing.

This configuration of the optical crossconnect system 315 can be easily scaled by using additional rows and columns of optical mirror systems 310 due to their small size. The systems 310 can be of the type shown in FIGS. 1–4. A typical size of an optical mirror system 310 is 0.8 mm×0.8 mm, having a switch time of 0.2 seconds.

Now the operational features of the optical mirror system 115 and 215 as illustrated in FIGS. 1–4 will be described.

The operation of the optical mirror system 115 and the functional interconnections among the various elements of the system 115 is explained.

The holding plate 140 and the drawing members 150 operate integrally to drive the drawbridge assembly 116. The holding plate 140 having the T-shaped aperture 141 is connected to the substrate 100 by the micromachined hinge 142 forming a rotational axis for the vertical displacement and support of the holding plate 140. When the T-shaped head 151 of the drawing beam 150 are latched into the T-shaped aperture 141, the holding plate 140 can support the bending biasing mechanism 130 at various angles, forming a drawbridge assembly 116.

The angle of the various inclinations of the biasing mechanism 130 and the holding plate 140 is determined by the length of the drawing member 150, the distance from the T-shaped aperture 141 to the rotational axis of the holding plate 140, and the separation of the rotational axis of the holding plate 140 and the drawing member 150. Moreover, the width of the drawing member 150 and the holding plate 140 may also affect the inclination angle of the bending biasing mechanism 130 and the holding plate 140.

In this example, the use of the bending biasing mechanism 130 significantly influences the configuration of the resulting drawbridge assembly 116 and the optical mirror system 115. In this embodiment, a plurality of bending beams are used to mechanically couple the mounting plate 120 to the holding plate 140. The bending beam has the same thickness as the mounting plate 120 but the width of the bending beam is different than the width of the mounting plate 120. Due to this configuration, most of the deformation is concentrated on the bending beams while the mounting plate is displaced vertically. The width and length of the bending beams also determine the degree of tension and inflexibility as well as the optical switch time, driving voltage, and driving current. The deformation caused by the vertical mirror 110 and the mounting plate 120 are negligible and the bending beams can support a sufficient amount of deformation caused by the actuating mechanism in addition to the weight of the reflective assembly 117.

For the operation of light switching, referring to FIGS. 1(a), 1(b), 2(a) and 2(b), the vertical mirror 110 mounted on the mounting plate 120 is supported by the drawbridge assembly 116 and positioned over the upper surface of the substrate 110 to reflect incoming light beams. A spacing between the upper surface of substrate 100 and the mounting plate 120 allows the reflective assembly 117 to move vertically, enabling the vertical mirror 110 to be displaced in different positions over the substrate 100. When an electrostatic force such as a driving force is applied between the electrode 170 and the mounting plate 120 by an electrostatic or electromagnetic actuating mechanism, the entire reflective assembly 117 inclines downward, displacing the vertical mirror 110 vertically and causing the optical mirror system 115 to enter a reflective state (FIG. 2).

Consequently, the vertical mirror 110 enters the path of the input light beam 180 and the reflective assembly 117 redirects the input light beam 180 to the output light beam 182, thereby achieving optical switching. Optical attenuation is also accomplished as the reflective function of the vertical mirror controls the light energy which is reflected and transmitted to an output light beam. In other words, changing the position of the vertical mirror 110 after partially redirecting the light beam, different light energies of light reflection and transmission are obtained, leading to optical attenuation.

Subsequently, when the voltage is removed, the reflective assembly 117 returns to its resting state by the recovery force in the bending beams 130. In this non-reflective state, the non-inclined configuration of the reflective assembly 117 causes incoming light beams to pass through the optical mirror system 115 unchanged in direction, as illustrated in FIG. 1. In short, optical switching and optical attenuation are implemented by adding and removing a driving voltage to the actuating mechanism mounted on the surface of the substrate 100. This in turn, induces the inclined and non-inclined configurations of the reflective assembly 117 and 217 illustrated in FIGS. 1–4.

Various actuation mechanisms can be employed to drive the vertical mirror 110 such as electrostatic actuation, electromagnetic actuation, and thermal actuation. In particular, the electrostatic and electromagnetic modes provide the high dynamic response and the low power consumption desirable in generating large array crossconnect systems. Moreover, electrostatic and electromagnetic mechanisms include the advantages of low heating, easy fabrication, compatibility with existing IC process, high tolerability to environmental factors, and particularly, high dynamic response in operation. Although only the electrostatic actuating mechanisms are illustrated in the embodiments, electromagnetic actuating mechanisms can equally be implemented within the optical systems shown.

The anti-disintegration interlocker 160 is employed to prevent the disintegration of the drawbridge assembly 116 in dynamic operation. In particular, the anti-disintegration interlocker 160 prevents the T-shaped head 151 of the drawing member 150 from collapsing and separating from the T-shaped aperture 141 of the holding plate 140.

The operation of the optical mirror system 215 using an alternate biasing mechanism 230 is described. In this embodiment, springs form the biasing mechanism 230 coupling the mounting plate 220 to the holding plate 240 so that the reflective assembly 217 may reflect the optical light beams. Because springs may not maintain a static inclination of the mounting plate 220, one end of the mounting plate is anchored to the substrate 200 by flexible beams or attached to the substrate 200 by micromachined hinges.

Figure 2:
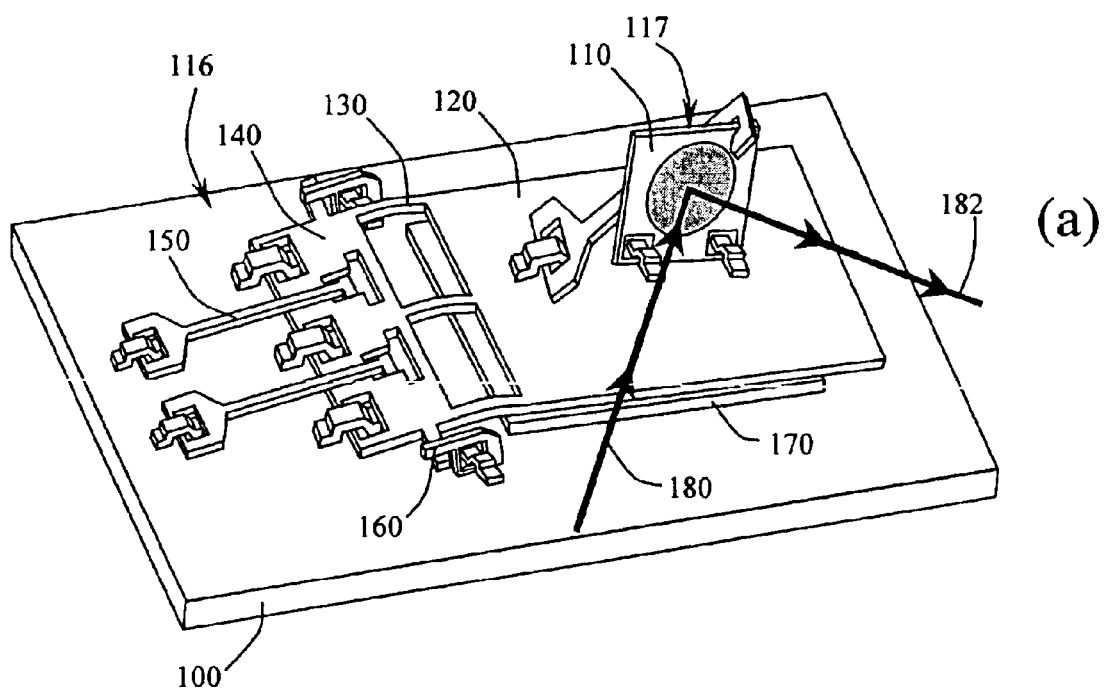
FIG. 2(a) is a perspective view of an optical mirror system in a reflective state.
FIG. 2(b) is a side view of the optical mirror system of FIG. 2(a).
Figure 2:
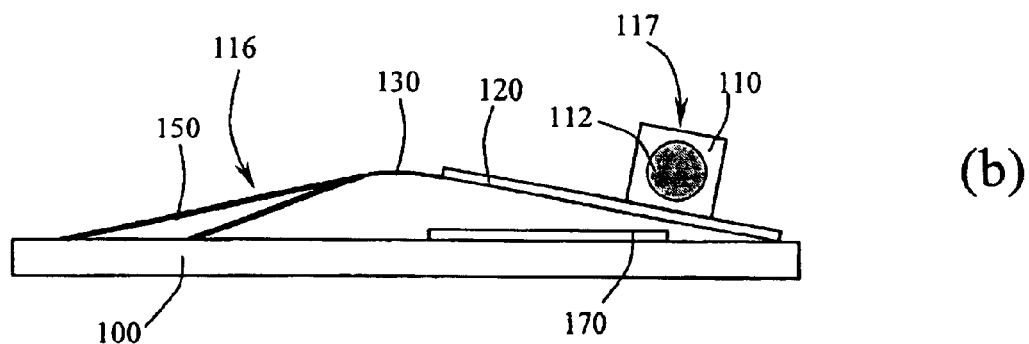

Generally, the operation of the optical mirror system 215, as illustrated in FIGS. 3 and 4, is similar to the operation of the optical mirror system 115 shown in FIGS. 1 and 2.

In the reflective state of the optical mirror system 215, the reflective assembly 217 is displaced vertically and inclined downward by a driving voltage between the mounting plate 220 and the electrode 270. In the drawbridge assembly 216, the spring biasing mechanism 230 is extended with the vertical displacement of the mounting plate 220. Consequently, as the input light beam 280 is reflected by the vertical mirror 210, the input light beam 280 is redirected to the output light beam 282.

Thereafter, the electrostatic actuating mechanism or voltage is removed and the elastic force in the spring biasing mechanism 230 lifts the mounting plate 220 upward to its resting state, thereby moving the vertical mirror 210 vertically upward. This way, in the non-reflective state of the optical mirror system 215, the reflective part 212 of the vertical mirror 210 is removed from the path of the input light beam 270.

If an actuating mechanism in the form of an electromagnetic actuator is used, a coil is formed on the mounting plate 220 while an external magnetic field is applied using a magnet. The driving current passing through the coil generates a magnetic field which interacts with the external field and drives the mounting plate 220 to displace vertically.

Referring to FIG. 5, the operation of the free space MEMS-based optical crossconnect system 315 is described. Generally optical crossconnect systems are made in waveguide. However, MEMS-based optical crossconnect systems have advanced rapidly improving the fabrication process of optical crossconnect systems. Compared with its waveguide counterparts, MEMS-based optical crossconnect systems operate in free space and provide high switching contrast, low insertion loss, small crosstalk, tolerance to wavelength and polarization, transparency to data format and speed, compactness and low cost.

In optical crossconnect systems, the vertical mirrors determine the direction and path of the light beams which pass unmoved and intact without carrying information about data or speed. In contrast, the optical signals operate interferometrically and/or diffractively in waveguide crossconnect systems, thereby strongly relying on the wavelength and polarization. Moreover, nonlinear effects such as Four Wave Mixing (FWM) and Self-Phase Modulating (SPM), influence the transmission quality for different data format and speed.

The operation of the free space optical crossconnect system 315 begins when light beams from a plurality of input optical fibers 311 are collimated by micro-lens array 312. The collimated light beams pass through the non-reflective state optical mirror systems 302 and are reflected and redirected by the reflective state optical mirror systems 301 toward a desired light path. Meanwhile, the micro-lens array 322 couple the light signals into a plurality of output optical fibers 321. The fibers 331 and the collimating lenses 332 are employed to drop the light beams from the input fibers 311, and the fibers 341 along with the lenses 342 are used to add the light beams to the output fibers 321.

Furthermore, if a larger array of optical mirror systems is required, the optical crossconnect system can be easily scaled by forming additional rows and columns of the optical mirror systems, whose small size makes this a concise operation.

The method of fabricating the optical mirror systems of the present invention is described next. The bulk micromachining and the surface micromachining technologies are the main methods used to fabricate MEMS components, including the vertical mirrors and the actuating mechanisms used in the present invention. In bulk micromachining technology, the surface of the vertical mirror 110 and 210 is directly formed by deep etching of the silicon wafer. The bulk method takes advantage of the property that the etching rate is dependent on the crystalline direction and the doping concentration while etching single crystalline silicon wafers. The surface micromachining method deposits the structural layers sandwiched by the individual sacrificial layers. After the sacrificial layers have been etched (e.g. etching $SiO_2$ by HF), the desired components are released.

The bulk micromachining is able to fabricate MEMS components with a large thickness (limited by the wafer thickness). However, the component structure in the vertical direction should be simple. In contrast, although the surface micromachining method is capable of fabricating components with complex vertical structures, the thickness of the components is limited to several microns.

In fact, the vertical mirrors 110 and 210 of FIGS. 1–4, the actuating mechanism, as well as other surface structures of the optical mirror system may be fabricated not only by bulk micromachining technology but also by surface micromachining methods. Regardless of the fabrication and structural defining processes used, the surface of the vertical mirror 110 and 210 should to be coated with a metal layer to increase its reflectivity.

Figure 6:
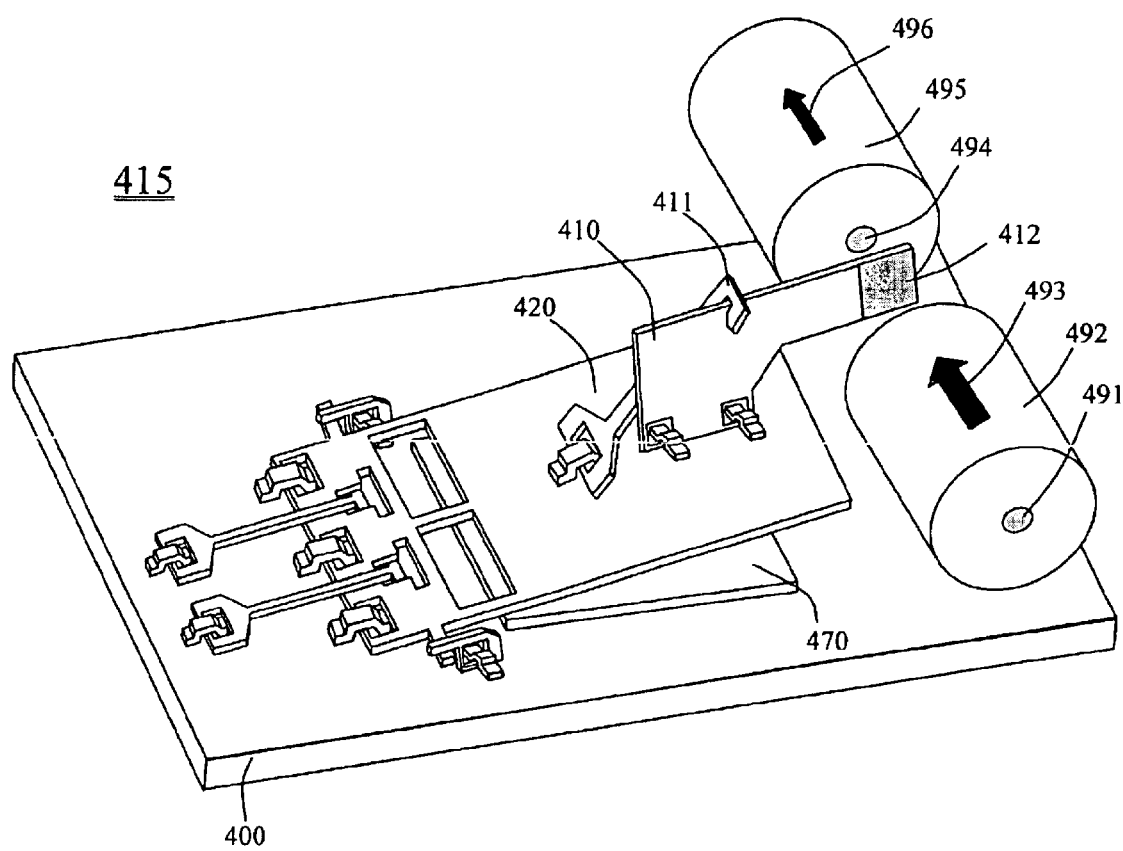
FIG. 6(a) is a perspective view of a single VOA.
FIG. 6(b) is a diagrammatic view of a position relationship of the mirror and the output fiber.
Figure 6:
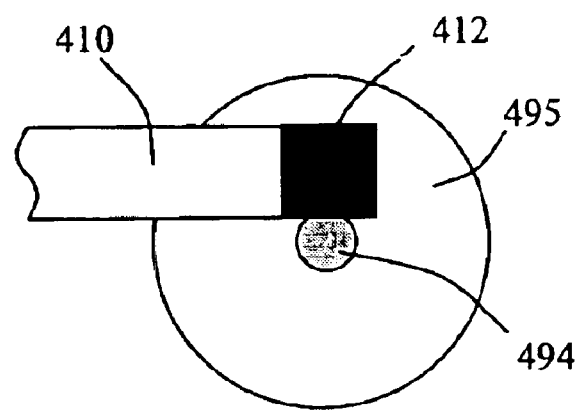

Referring to FIGS. 6(*a*) and 6(*b*), a single VOA system 415 includes a substrate 400, a drawbridge assembly 420 and two optical fibers 492 and 495. The drawbridge assembly includes a mirror 412 attached and deposited at the end of a L-shaped plate 410. The plate 410 is maintained in vertical position by a head holder 411. A light signal 493 is transmitted in the fiber core 491 of the input fiber 492. When the light signal 493 enters the free space, the light signal 493 is partially blocked by the mirror 412. Only a portion of light 496 is coupled into the core 494 of the output fiber 495. By applying the voltage between the drawbridge assembly 420 and the electrode 470, the position of the mirror 412 can be finely controlled, resulting in variable attenuation.

Figure 7:
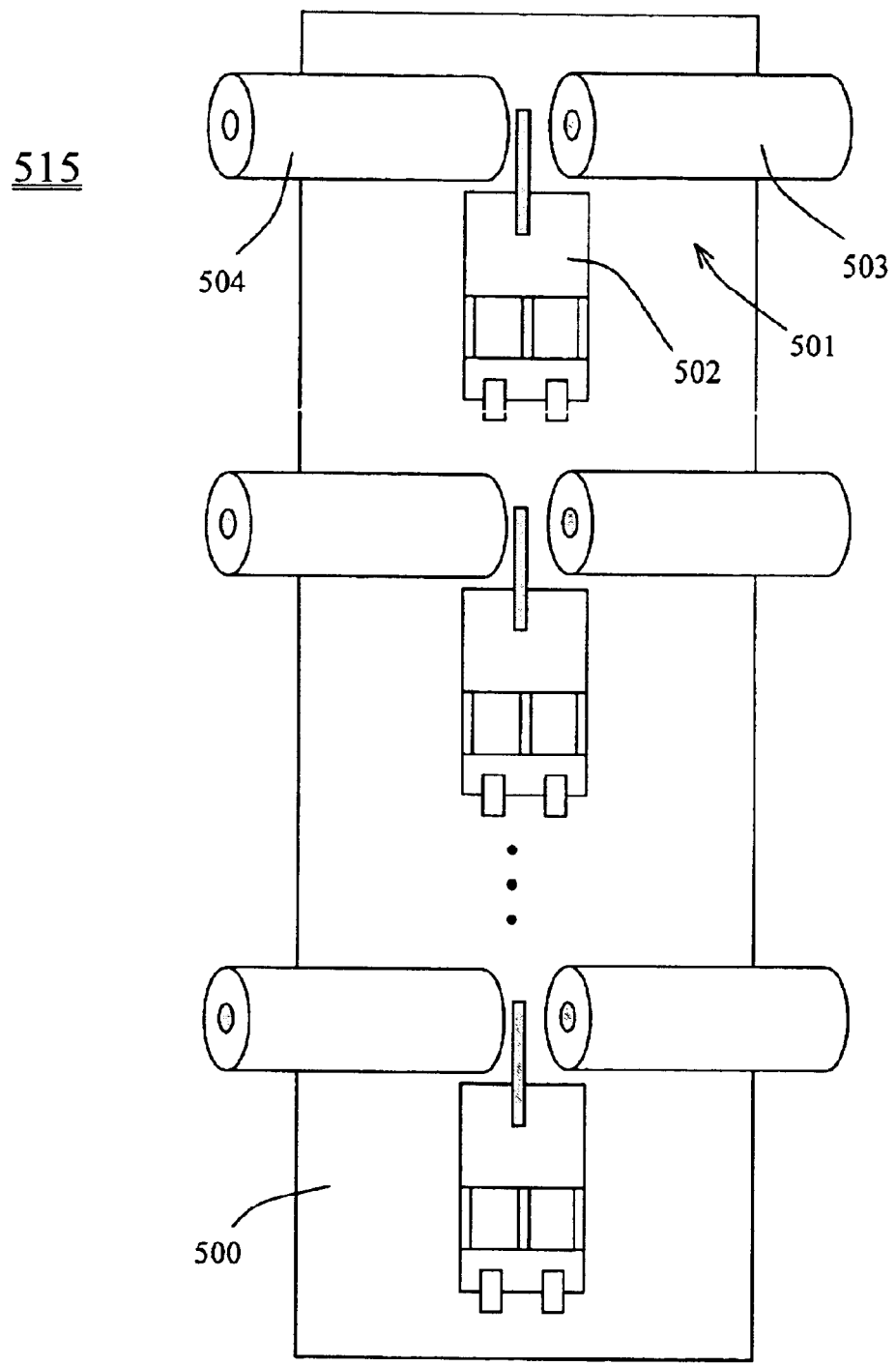
FIG. 7 is a diagrammatic view of a multi-channel VOA.

Referring to FIG. 7, a multi-channel VOA system 515 includes a series of VOA system 501 and a substrate 500. The VOA system 501 includes a drawbridge assembly 502, an input fiber 503, and an output fiber 504.

A number of embodiments of the invention have been described. Nevertheless, it will be understood that various modifications may be made without departing from the spirit and scope of the invention. Accordingly, other embodiments are within the scope of the following claims.

What is claimed is:

1. An optical mirror system comprising:
a substrate;
a reflective assembly coupled to the substrate;
an actuating mechanism coupled to the substrate; and
a drawbridge assembly mechanically coupled to the reflective assembly, the drawbridge assembly having a biasing mechanism for coupling the reflective assembly to the substrate, wherein upon activation of the actuating mechanism, the biasing mechanism bends the reflective assembly from a first position in which the reflective assembly is in a non-reflective state and a second position in which the reflective assembly is in a reflective state.

2. The optical mirror system of claim 1, wherein the drawbridge assembly comprises:
a holding plate; and
at least one drawing member having two ends, a first end fixedly attached to the substrate.

3. The optical mirror system of claim 2, wherein the holding plate mechanically supports the biasing mechanism and is connected to a second end of the at least one drawing member.

4. The optical mirror system of claim 2, wherein the non-reflective state of the reflective assembly forms a non-inclined configuration of the drawbridge assembly maintained by a resting state of the biasing mechanism.

5. The optical mirror system of claim 4, wherein the non-inclined configuration of the drawbridge assembly permits a light beam to travel in a path unaffected and unchanged in a same direction.

6. The optical mirror system of claim 4, wherein the holding plate remains unchanged in the non-reflective configuration.

7. The optical mirror system of claim 2, wherein the reflective state of the reflective assembly forms an inclined configuration of the drawbridge assembly caused by the actuating mechanism and a non-resting state of the biasing mechanism.

8. The optical mirror system of claim 7, wherein the inclined configuration of the drawbridge assembly redirects a light beam from a path by reflecting the light beam and directing the light beam to travel in a different direction.

9. The optical system of claim 7, wherein the holding plate inclines and moves downward in the reflective configuration.

10. The optical mirror system of claim 2, wherein the biasing mechanism includes a flexible structure for shaping the reflective state and the non-reflective state of the optical assembly.

11. The optical mirror system of claim 2, wherein the flexible structure is of a bending type.

12. The optical mirror system of claim 10, wherein the flexible structure is of a spring type.

13. The optical mirror system of claim 2, wherein the at least one drawing member supports the holding plate, a second end of the at least one drawing member attached to the holding plate by a latching mechanism.

14. The optical mirror system of claim 2, wherein the first end of the at least one drawing member is securely fixed to the substrate by a microhinge mechanism.

15. The optical mirror system of claim 2, wherein the actuating mechanism can be a thermal actuator, an electromagnetic actuator, or an electrostatic actuator.

16. The optical mirror system of claim 1, wherein the reflective assembly comprises:
a mounting plate; and
a vertical mirror mechanically coupled to the mounting plate.

17. The optical mirror system of claim 16, wherein the actuating mechanism is an electrode.

18. The optical mirror system of claim 17, wherein the electrode is disposed relative to the mounting plate of the reflective assembly.

19. The optical mirror system of claim 16, wherein the vertical mirror is three-dimensional.

20. The optical mirror system of claim 19, wherein the mounting plate is mechanically coupled to the vertical mirror by at least one rotatable hinge.

21. The optical mirror system of claim 19, wherein the vertical mirror is maintained and held at an upright position relative to the mounting plate by at least one holder.

22. The optical mirror system of claim 21, wherein the holder includes two ends, a free end having a groove region for securely holding the vertical mirror at the upright position, and a fixed end mechanically coupled to the mounting plate.

23. The optical mirror system of claim 19, further comprising a non-reflective state having a non-inclined configuration of the drawbridge assembly and a reflective state having an inclined configuration of the drawbridge assembly.

24. The optical mirror system of claim 23, wherein the actuating mechanism drives the mounting plate downward in a reflective configuration, thereby redirecting a path of a light beam.

25. The optical mirror system of claim 23, wherein the mounting plate remains unchanged in a resting state in the non-inclined configuration of the drawbridge assembly, permitting a light beam to travel in a path unaffected and unchanged in a same direction.

26. The optical mirror system of claim 19, wherein the actuating mechanism includes a flexible structure for shaping the reflective state and the non-reflective state of the optical assembly.

27. The optical mirror system of claim 26, wherein the flexible structure is of a bending type.

28. The optical mirror system of claim 26, wherein the flexible structure is of a spring type.

29. The optical mirror system of claim 19, wherein the actuating mechanism can be a thermal actuator, an electromagnetic actuator, or an electrostatic actuator.

30. The optical mirror system of claim 29, wherein the actuating mechanism is an electrode.

31. The optical mirror system of claim 30, wherein the electrode is disposed relative to the mounting plate.

32. The optical mirror system of claim 30, wherein a voltage is applied between the mounting plate and the electrode causing the mounting plate to move.

33. The optical mirror system of claim 16, further comprising a locking mechanism to mechanically mount the drawbridge assembly to the substrate for increased mechanical stability and operation of the optical mirror system.

34. The optical mirror system of claim 33, wherein the locking mechanism comprises anti-disintegration interlockers.

35. The optical mirror system of claim 1, further comprising a locking mechanism to mechanically mount the drawbridge assembly to the substrate for increased mechanical stability and operation of the optical mirror system.

36. The optical mirror system of claim 35, wherein the locking mechanism comprises anti-disintegration interlockers.

37. The optical mirror system of claim 17, wherein a voltage is applied between the mounting plate and the electrode causing the mounting plate to move.

38. The optical mirror system of claim 1, wherein the optical system forms an optical switch, an optical crossconnect, an optical add and drop multiplexer, and a variable optical attenuator.

39. An optical mirror system comprising:
a substrate;
a reflective assembly coupled to the substrate;
an actuating means coupled to the substrate; and
a displacing means mechanically coupled to the reflective assembly, the displacing means including a holding plate and a drawing means having two ends, a first end fixedly attached to the substrate, the displacing means having a biasing means for coupling the reflective assembly to the substrate, wherein upon activation of the actuating means, the biasing means bends the reflective assembly from a first position in which the reflective assembly is in a non-reflective state and a second position in which the reflective assembly is in a reflective state.

40. The optical mirror system of claim 39, wherein the reflective assembly comprises:
a mounting plate; and
a vertical mirror mechanically coupled to the mounting plate.

41. An optical add/drop multiplexer comprising:
a light beam traveling along a path;
at least one optical mirror system comprising:
    a substrate;
    a reflective assembly attached to the substrate;
    an actuating mechanism attached to the substrate;
    a drawbridge assembly mechanically coupled to the reflective assembly, the drawbridge assembly having a biasing mechanism for coupling the reflective assembly to the substrate, wherein upon activation of the actuating mechanism, the biasing mechanism bends the reflective assembly from a first position in which the reflective assembly is in a non-reflective state and a second position in which the reflective assembly is in a reflective state;
at least one input fiber for emitting the light beam;
at least one output fiber for receiving the light beam;
at least one add fiber for adding the light beam; and
at least one drop fiber for dropping the light beam;
wherein the light beam passes through the at least one optical system and the path of the light beam is determined by an reflective state and a non-reflective state of the optical mirror system.

42. An optical crossconnect system comprising:
a light beam traveling along a path;
at least one optical mirror system comprising:
    a substrate;
    a reflective assembly coupled to the substrate;
    an actuating mechanism coupled to the substrate;
    a drawbridge assembly mechanically coupled to the reflective assembly, the drawbridge assembly having a biasing mechanism for coupling the reflective assembly to the substrate, wherein upon activation of the actuating mechanism, the biasing mechanism bends the reflective assembly from a first position in which the reflective assembly is in a non-reflective state and a second position in which the reflective assembly is in a reflective state;
at least one input fiber for emitting the light beam; and
at least one output fiber for receiving the light beam;
wherein the light beam passes through the at least one optical system and the path of the light beam is determined by an reflective state and a non-reflective state of the optical mirror system.

43. The optical crossconnect system of claim 42, further comprising an array of collimating lenses and an array of coupling lenses for signal coupling and collimation of the light beam.

44. The optical crossconnect system of claim 42, further comprising a scalable configuration having a plurality of rows and columns.

45. The optical crossconnect system of claim 42, wherein the drawbridge assembly of the optical mirror system comprises:
a holding plate; and
at least one drawing member having two ends, a first end fixedly attached to the substrate.

46. The optical crossconnect system of claim 42, wherein the reflective assembly of the optical mirror system comprises:
a mounting plate; and,
a vertical mirror mechanically coupled to the mounting plate.

47. A variable optical attenuator comprising:
a drawbridge assembly mechanically coupled to a reflective assembly of a substrate, the drawbridge assembly having a biasing mechanism for coupling the reflective assembly to the substrate, wherein upon activation of an actuating mechanism attached to the substrate, the biasing mechanism bends the reflective assembly continuously and maintains the reflective assembly at any position between the first position and the second position in which the reflective assembly is in a reflective state.

48. The variable optical attenuator of claim 47, further comprising a multi-channel variable optical attenuator.

49. A multi-channel variable optical attenuator comprising:

a plurality of variable optical attenuators, each variable optical attenuator having a drawbridge assembly mechanically coupled to a reflective assembly of a substrate, the drawbridge assembly having a biasing mechanism for coupling the reflective assembly to the substrate, wherein upon activation of an actuating mechanism attached to the substrate, the biasing mechanism bends the reflective assembly continuously and maintains the reflective assembly at any position between the first position and the second position in which the reflective assembly is in a reflective state, wherein the plurality of variable optical attenuators are mounted on a single substrate and are aligned in parallel configurations.

* * * * *